(12) United States Patent
Larry et al.

(10) Patent No.: US 12,204,223 B2
(45) Date of Patent: Jan. 21, 2025

(54) SYSTEMS AND METHODS FOR A MULTIFUNCTIONAL VISOR FOR A VEHICLE

(71) Applicant: Ford Global Technologies, LLC, Dearborn, MI (US)

(72) Inventors: Mark Larry, Macomb, MI (US); Biaohe Guo, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 424 days.

(21) Appl. No.: 17/060,813

(22) Filed: Oct. 1, 2020

(65) Prior Publication Data

US 2022/0105786 A1 Apr. 7, 2022

(51) Int. Cl.
| | | |
|---|---|---|
| *G02F 1/157* | (2006.01) | |
| *G02F 1/133* | (2006.01) | |
| *G02F 1/15* | (2019.01) | |
| *G02F 1/163* | (2006.01) | |
| *B60J 3/02* | (2006.01) | |
| *B60K 35/00* | (2006.01) | |
| *B60K 35/22* | (2024.01) | |
| *B60K 35/60* | (2024.01) | |

(52) U.S. Cl.
CPC .......... *G02F 1/157* (2013.01); *G02F 1/13306* (2013.01); *G02F 1/15* (2013.01); *G02F 1/163* (2013.01); *B60J 3/0282* (2013.01); *B60K 35/00* (2013.01); *B60K 35/22* (2024.01); *B60K 35/60* (2024.01); *B60K 2360/777* (2024.01); *G02F 2201/44* (2013.01)

(58) Field of Classification Search
CPC ... G02F 1/163; G02F 1/13306; G02F 2201/44
See application file for complete search history.

(56) References Cited

U.S. PATENT DOCUMENTS

| | | | |
|---|---|---|---|
| 6,437,900 B1 | 8/2002 | Cornelissen et al. | |
| 6,979,499 B2* | 12/2005 | Walck | G02B 27/0101 |
| | | | 359/359 |
| 7,636,188 B2 | 12/2009 | Baur et al. | |
| 9,493,121 B2* | 11/2016 | Hercules | G02F 1/133553 |
| 10,556,490 B2 | 2/2020 | Li | |
| 2016/0193902 A1 | 7/2016 | Hill et al. | |

FOREIGN PATENT DOCUMENTS

JP 2003048428 A * 2/2003

* cited by examiner

*Primary Examiner* — Dung T Nguyen
(74) *Attorney, Agent, or Firm* — Frank Lollo; Eversheds Sutherland (US) LLP

(57) ABSTRACT

The disclosure generally pertains to a visor system of a vehicle. The visor system may include a multifunctional visor having a multilayer stack. A first layer of the multilayer stack may include a material whose optical transmittance is modifiable in response to a control signal provided by a controller, a second layer containing a material whose optical reflectance is modifiable in response to another control signal provided by the controller, and a third layer, which is interposed between the first layer and the second layer and includes a display system that turns optically transparent in response to another control signal provided by the controller. An occupant of the vehicle can make a selection to place the multifunctional visor in any of various states, such as a mirror state, a visor state, or a display state (for displaying images such as a speedometer and/or a GPS route map).

9 Claims, 7 Drawing Sheets

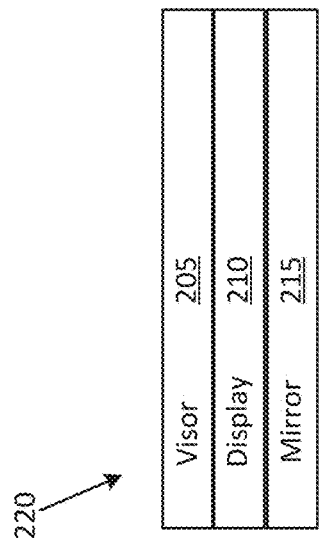
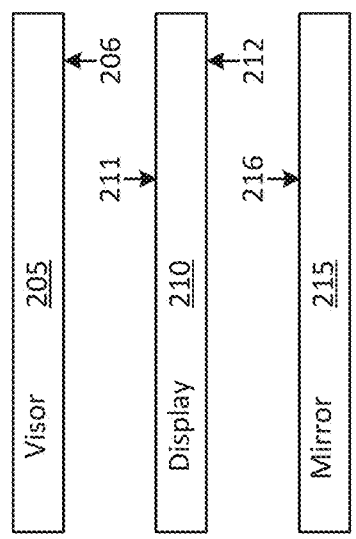
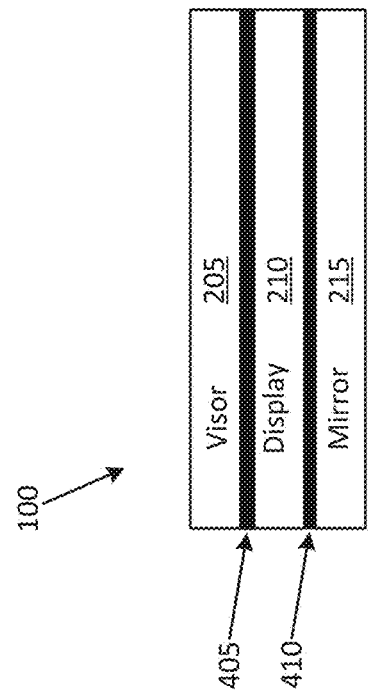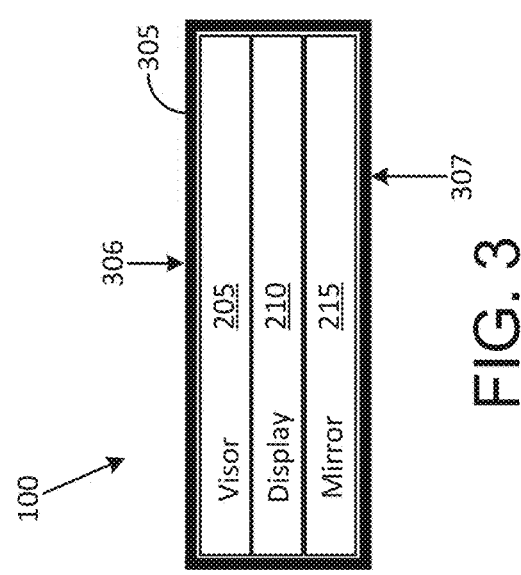

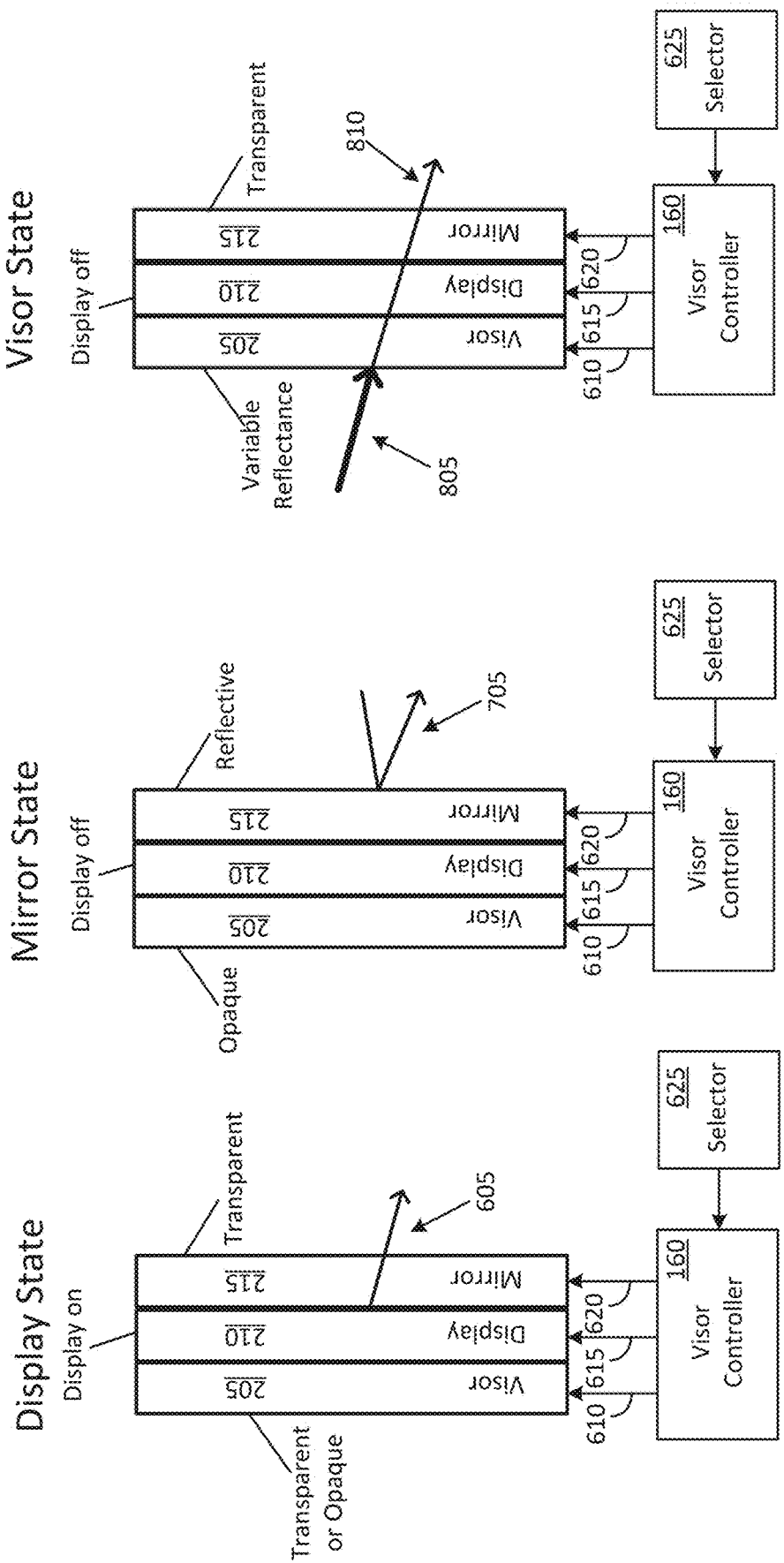

SYSTEMS AND METHODS FOR A MULTIFUNCTIONAL VISOR FOR A VEHICLE

BACKGROUND

Vehicles may include one or more displays that may be used to interact with various vehicle systems, display vehicle information (e.g., a GPS route map, camera images from a back-up camera, etc.), and/or provide Internet capabilities (email, text, browsing etc.). Therefore, is it desirable to improve upon vehicle displays to provide a better user experience.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 2A illustrates some example components that may be included in a multifunctional visor in accordance with an embodiment of the disclosure.

FIG. 2B illustrates a multilayer stack that can be a part of a multifunctional visor in accordance with an embodiment of the disclosure.

FIG. 3 illustrates an example implementation of a multifunctional visor in accordance with an embodiment of the disclosure.

FIG. 4 illustrates another example implementation of a multifunctional visor in accordance with an embodiment of the disclosure.

FIG. 6 illustrates a configuration wherein the multifunctional visor has been placed in a display state in accordance with an embodiment of the disclosure.

FIG. 7 illustrates another configuration wherein the multifunctional visor has been placed in a mirror state in accordance with an embodiment of the disclosure.

FIG. 8 illustrates yet another configuration wherein the multifunctional visor has been placed in a visor state in accordance with an embodiment of the disclosure.

DETAILED DESCRIPTION

Overview

Figure 1:
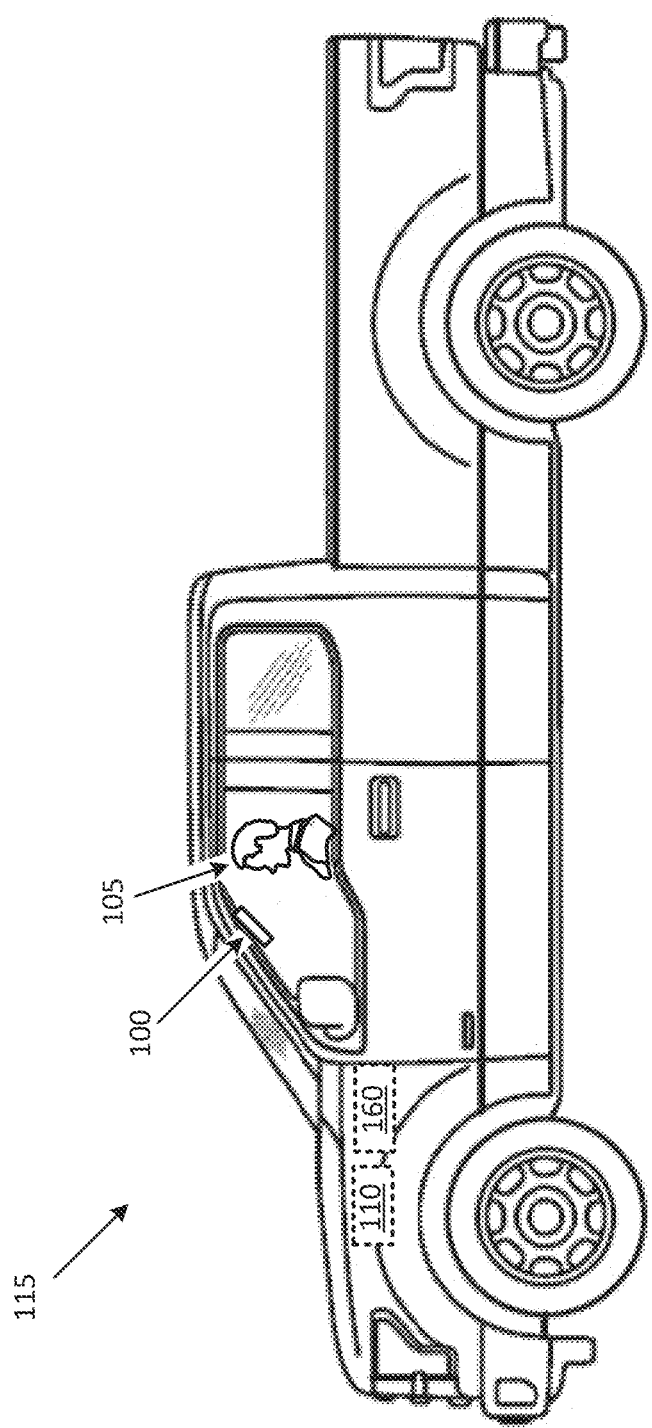
FIG. 1 shows a vehicle equipped with a multifunctional visor in accordance with an embodiment of the disclosure.

The systems and methods disclosed herein generally pertain to a visor system of a vehicle. The visor system may include a multifunctional visor incorporating a multilayer stack. A first layer of the multilayer stack includes a material whose optical transmittance is modifiable in response to a control signal provided by a controller. The second layer includes a material whose optical reflectance is modifiable in response to another control signal provided by the controller. The third layer, which is interposed between the first layer and the second layer, can include a display system that turns optically transparent in response to yet another control signal provided by the controller. An occupant of a vehicle in which the multifunctional visor is mounted can make a selection (on a selector switch, for example) and place the multifunctional visor in any of various states that include a display state, a mirror state, and a visor state. The display state can be used to observe various types of images, such as, for example, a speedometer, a GPS route map, and/or a reflection of the face of the occupant (mirror function). When the multifunctional visor is placed in the mirror state, the occupant of the vehicle may use the multifunctional visor as a vanity mirror. When the multifunctional visor is placed in the visor state, the occupant may adjust an amount of light propagating through the multifunctional visor from outside the vehicle, in accordance with personal preference. However, in some implementations in accordance with the disclosure, the amount of light propagating through the multifunctional visor can be automatically adjusted by the controller in accordance with information received from an ambient light sensor that is arranged to detect an amount of ambient light present outside the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. For example, some or all of the functionalities described herein with respect to an example three-layer multifunctional visor may, in certain embodiments, be performed by a multifunctional visor having more than three layers or less than three layers. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used in this disclosure can pertain to any one of various types of vehicles, such as, for example, cars, vans, sports utility vehicles, buses, trucks, electric vehicles, gasoline vehicles, hybrid vehicles, and autonomous vehicles. In some cases, the "vehicle" can be a non-powered vehicle, such as a trailer, that is attached to a powered vehicle (a truck, for example). Words, such as "function," "state," "conditions," "functionality," etc., may be used interchangeably in this disclosure and must be understood in at least some instances to be equivalent to each other. More particularly, the word "layer" as used herein in a generic manner encompasses various types of structures, such as, for example, a planar element containing one or more materials, a film made of one or more materials, a multilayer element manufactured by depositing one or more materials upon a substrate, or a film that is attached to a transparent sheet (a plastic sheet, a glass sheet, etc.).

FIG. 1 shows a vehicle 115 equipped with a visor system in accordance with an embodiment of the disclosure. The visor system includes a multifunctional visor 100 that may be coupled to various other devices in the vehicle 115, such as for example, a visor controller 160 and a vehicle controller 110. In this example illustration, a driver 105 is seated in the cabin of the vehicle 115 and can use the multifunctional visor 100 in various ways based on his/her personal preferences. In some implementations, an additional multifunctional visor may be installed on the passenger side of the vehicle 115 and may be used by a passenger in various ways according to the passenger's preferences.

It must be understood that the vehicle 115, though illustrated as a truck, may take the form of any other passenger or commercial automobile, such as, for example, a car, a sport utility, a crossover vehicle, a van, a minivan, a taxi, or a bus, in accordance with the disclosure. The vehicle 115 may have various types of automotive drive systems in various applications. Example drive systems can include various types of internal combustion engine (ICE) powertrains having a gasoline, diesel, or natural gas-powered combustion engine with conventional drive components, such as, a transmission, a drive shaft, a differential, etc.

In some cases, the vehicle 115 may be configured as an electric vehicle (EV). More particularly, the vehicle 115 may include a battery EV (BEV) drive system. The vehicle 115 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 115 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components. Further, in some cases, the vehicle 115 may be a manually driven vehicle, and/or be configured to operate in a fully autonomous or partially autonomous mode.

The vehicle 115 can include various components, such as the vehicle controller 110 and the visor controller 160, one or both of which may be installed in an engine compartment of the vehicle 115 (as schematically illustrated in FIG. 1) or elsewhere in the vehicle 115. The vehicle controller 110 is arranged to cooperate with components of the vehicle 115, such as a fuel injection system and a speed control system, to control various operations of the vehicle 115. Some example functions may include controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The visor controller 160 is communicatively coupled to the multifunctional visor 100 in accordance with the disclosure. In an example implementation, some or all parts of the visor controller 160 may be incorporated into the vehicle controller 110. In another example implementation, the visor controller 160 may be installed in the vehicle 115 in the form of a standalone device. The multifunctional visor 100 may be communicatively coupled to various other devices in the vehicle 115, such as, for example, a navigation system that provides global positioning system (GPS) signals, a heads-up display (HUD) system that provides content that may be displayed on a HUD display screen, a phone communication system, and/or an infotainment system.

FIG. 2A illustrates some example components that may be included in the multifunctional visor 100 in accordance with an embodiment of the disclosure. In this example embodiment, the multifunctional visor 100 includes a multilayer stack 220 formed of three layers. In other embodiments, the multilayer stack 220 can include two layers or can include more than three layers. The first layer, which is referred to in this disclosure as a visor 205, may be fabricated to include an electrochromic material whose optical transmittance is modifiable by application of a first control signal. The first control signal that is applied to the visor 205 may be a voltage that is provided by the visor controller 160. The visor controller 160 may set an amplitude of the voltage in accordance with a level of opacity (or translucence) that is desired by an occupant of the vehicle 115, such as, for example, the driver 105 shown in FIG. 1. In an example implementation, the visor 205 can be made of a switchable opaque film that is based on polymer-dispersed liquid crystal (PDLC) technology. In another example implementation, the visor 205 can be made of a switchable opaque film that is based on suspended particle devices (SPD) technology. SPD technology is already in use in various applications, such as in smart watches.

The second layer, which is referred to in this disclosure as a mirror 215, may be fabricated to include a material whose optical reflectance is modifiable by application of a second control signal. The second control signal that is applied to the mirror 215 may be another voltage that is provided by the visor controller 160. The visor controller 160 may at a first instant in time (when so desired by the driver 105 of the vehicle 115), couple into the second layer, a voltage having an amplitude that causes the mirror 215 to turn reflective. The driver 105 may then use the mirror 215 in various conventional ways, such as, for example, to view a reflection of his/her face, to look at an object behind him/her inside the vehicle 115, or to look at an object outside the vehicle 115 (behind the vehicle 115, for example). The visor controller 160 may at another instant in time (when the driver 105 no longer intends to use the mirror 215) couple into the second layer, a voltage having another amplitude that causes the mirror 215 to turn transparent.

In an example implementation, the mirror 215 may be formed of a liquid crystal display (LCD) material that can be electrically switched between a reflective state and a transparent state. In some cases, the reflective state may provide a reflection level between 70% and 90% and the transparent state may provide a transparency level between 70% and 90%.

The third layer, which is interposed between the mirror 215 and the visor 205 is referred to in this disclosure as a display 210. The display 210 includes a material that turns optically transparent in response to a third control signal provided by the visor controller 160. The third layer may be set to a transparent condition at various times, such as when the driver 105 desires to use the visor 205 to block sunlight from falling on his/her face. The display 210 can further include a display screen configured to display various types of images, including heads-up display (HUD) images. In various example implementations, the display 210 may incorporate organic light emitting diode (OLED) display technology, LCD technology, micro-LED technology, and/or quantum dot LED technology.

The three layers described above may be stacked together to form the multilayer stack 220 (shown in FIG. 2B) that can be a part of the multifunction visor 100 in accordance with the disclosure. When stacked together, a major planar surface 206 of the visor 205 may be attached to, or placed parallel to, a major planar surface 211 of the display 210. A major planar surface 212 of the display 210 may be attached to, or placed parallel to, a major planar surface 216 of the mirror 215.

FIG. 3 illustrates an example implementation of the multifunctional visor 100 in accordance with an embodiment of the disclosure. In this implementation, the multilayer stack 220 is placed inside an enclosure 305. The dimensions of the enclosure 305 are selected to permit the multilayer stack 220 to snugly fit inside the enclosure 305 and prevent lateral displacement between the layers. The overall size, form factor, and thickness of the enclosure 305 may be similar to those employed in a conventional visor or may be tailored in accordance with various factors, such as, for example, the dimensions of the windshield of the vehicle 115 and/or the preferences of customers who purchase the vehicle 115. Major face 307 and opposing major face 306 of the enclosure 305 may be made of a transparent material, such as, for example, clear plastic.

In this implementation, the major planar surface 206 of the visor 205 may be placed in direct contact with the major planar surface 211 of the display 210 and the major planar surface 212 of the display 210 may be placed in direct contact with the major planar surface 216 of the mirror 215 with no intermediate layers or other materials. The three layers may thus be stacked together without the use of bonding materials, such as adhesives. The elimination of the bonding material may provide certain benefits, such as, for example, eliminating the need to use an adhesive that is completely transparent and includes no bubbles or other irregularities.

FIG. 4 illustrates another example implementation of the multifunctional visor 100 in accordance with an embodiment of the disclosure. In this implementation, the multilayer stack 220 may either be left exposed or may be housed inside an enclosure. A bonding layer 405 made of a transparent bonding material may be used to attach the major planar surface 206 of the visor 205 to the major planar surface 211 of the display 210. Another bonding layer 410 made of a transparent bonding material may be used to attach the major planar surface 212 of the display 210 to the major planar surface 216 of the mirror 215. The multilayer stack 220 in this implementation, may be referred to in alternative terms, as a laminated assembly or a sandwich arrangement.

In some embodiments, some or all of the layers of the multilayer stack 220 may be provided in the form of films. In one example implementation, the bonding layer 405 may be arranged to operate not only as a bonding agent but as a substrate that supports the visor 205 that is provided in the form of a film. In some cases, an object, such as, for example, a transparent plastic sheet (rigid or flexible) may be provided in the form of a substrate upon which the visor 205 (a film) may be applied. A bonding material may be applied to the major planar surface 206 of the visor 205 and a first major surface of the transparent plastic sheet for attaching the transparent plastic sheet to the major planar surface 206. The visor 205 in another implementation, can be a flexible sheet containing a material whose optical transmittance varies in response to a control signal from the visor controller 160.

The bonding material may be further applied to a second opposing major surface of the transparent plastic sheet and to the major planar surface 211 of the display 210 for attaching the transparent plastic sheet to the major planar surface 211 of the display 210. The display 210 in this case can be a film or a flexible sheet containing a material that turns optically transparent in response to another control signal from the visor controller 160.

A second transparent plastic sheet may be similarly used to bond the major planar surface 212 of the display 210 to the major planar surface 216 of the mirror 215. The mirror 215 in this case can be a film or a flexible sheet containing a material whose optical reflectance varies in response to yet another control signal from the visor controller 160.

Figure 5:
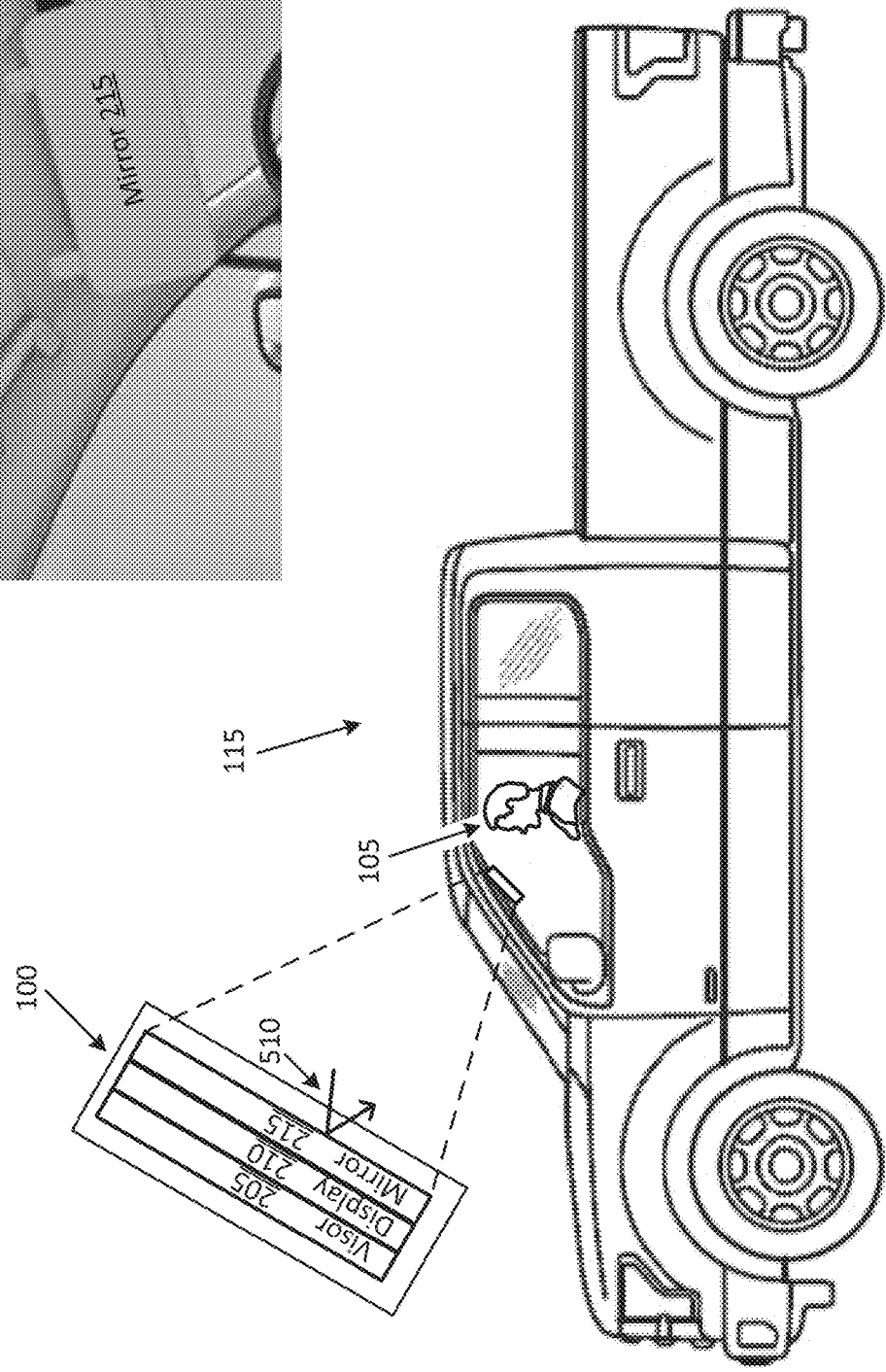
FIG. 5 shows an orientation of a multifunctional visor when placed in use in a vehicle.

FIG. 5 shows an orientation of the multifunctional visor 100 when placed in use in the vehicle 115. In this scenario, the driver 105 has positioned the multifunctional visor 100 so as to obtain shade in view of sunlight entering the vehicle 115 through the windshield. In another scenario, the multifunctional visor 100 may be positioned in a manner that provides shade from sunlight entering through the driver side window of the vehicle 115. In either scenario, the orientation of the multifunctional visor 100 is such that the visor 205 is closest to the driver 105 and the mirror 215 is farthest from the driver 105. The mirror 215 thus faces towards the cabin of the vehicle 115 and can be used by the driver 105 for observing his/her face or other objects. A reflective path 510 is shown to illustrate a reflective property of the mirror 215.

FIG. 6 illustrates a configuration wherein the multifunctional visor 100 has been placed in a display state in accordance with an embodiment of the disclosure. Placement of the multifunctional visor 100 in the display state may be carried out in response to a selection made on a selector 625 by an occupant of the vehicle 115 (the driver 105, for example). The selector 625 can be provided in various forms, such as, for example in the form of a hardware selector/switch/knob/button and/or in the form of a soft switch (a switch icon) on a touchscreen of an infotainment system that is communicatively coupled to the visor controller 160.

The selector 625 propagates a request signal to the visor controller 160 to place the multifunctional visor 100 in the display state. The visor controller 160 responds to the request by transmitting electrical control signals to the multilayer stack of the multifunctional visor 100. The electrical control signals may be transmitted over one or more of a line 610, a line 615, and a line 620. In this example, the visor controller 160 may provide a first voltage on the line 615 to turn on the display 210, another voltage on the line 620 to place the mirror 215 in a transparent condition, and yet another voltage on the line 610 to set the visor 205 in either an opaque condition or a transparent condition (based on various factors).

In one case, the visor 205 may be set to a transparent condition to allow the driver 105 to observe images on the display 210 as well as to see a road ahead. The images can be provided by various devices, such as, for example, a heads-up display, a camera, a GPS system, and/or a video player. The direction of light propagation from the display 210 and through the mirror 215 is indicated by a light path 605.

In another case, the visor 205 may be set to an opaque condition so as to allow the driver 105 to observe images on the display 210 with higher picture contrast than may be obtainable with the visor 205 in the transparent condition. In this case, the driver 105 does not observe the road through the multifunction visor 100.

It must be understood that the three lines (line 610, line 615, and line 620) that carry control signals in the form of voltages, from the visor controller 160 to the multilayer stack 220, are shown merely as one example implementation. In other implementations, less than or greater than 3 lines may be utilized and other types of control signals may be utilized in place of voltages. For example, in another implementation, the three lines may be replaced by a single line, such as for example, a single wire, a twisted pair of wires, a coaxial cable, or a wireless link, and the control signals may be propagated via the single line in the form of a multiplexed digital signal. The multiplexed digital signal may be demultiplexed at the multifunction visor 100 and coupled into digital-to-analog converters (DACs) for conversion into analog voltages. In the example configuration shown in FIG. 6, three DACs may produce three control voltages that may be coupled into the visor 205, the display 210, and the mirror 215.

FIG. 7 illustrates another configuration wherein the multifunctional visor 100 has been placed in a mirror state in accordance with an embodiment of the disclosure. Placement of the multifunctional visor 100 in the mirror state may be carried out in response to a selection made on a selector 625 by an occupant of the vehicle 115 (the driver 105, for example). The selector 625 propagates a request signal to the visor controller 160 to place the multifunctional visor 100 in the mirror state. The visor controller 160 responds to the request by transmitting electrical control signals to the multilayer stack of the multifunctional visor 100. For example, the visor controller 160 may provide a voltage on the line 610 to place the visor 205 in an opaque condition, another voltage on the line 615 to place the display 210 in an off condition, and yet another voltage on the line 620 to place the mirror 215 in a reflective condition. The driver 105 may use the mirror 215 as a vanity mirror in this configuration. Placing the visor 205 in an opaque condition increases the reflectivity characteristics of the mirror 215. The direction of light reflection from the mirror 215 is indicated by a light path 705.

A combination of the display state configuration and the mirror state configuration that are described above, may be provided in another example embodiment in accordance with the disclosure. In this example embodiment, the visor controller 160 may configure the multifunctional visor 100 to have multiple zones with multiple functionalities. For example, one portion of the multifunctional visor 100 may be configured to operate as a display (a left half of the multifunctional visor 100, for example) and another portion, as a mirror (a right half of the multifunctional visor 100, for example). The driver 105 of the vehicle 115 can use this combinational arrangement to keep an eye upon an image of a heads-up display on the left half of the multifunctional visor 100 while using the right half as a mirror to look at his/her face.

FIG. 8 illustrates yet another configuration wherein the multifunctional visor 100 has been placed in a visor state in accordance with an embodiment of the disclosure. Placement of the multifunctional visor 100 in the visor state may be carried out in response to a selection made on a selector 625 by an occupant of the vehicle 115 (the driver 105, for example). The selector 625 propagates a request signal to the visor controller 160 to place the multifunctional visor 100 in the visor state. The visor controller 160 responds to the request by transmitting electrical control signals on one or more of line 610, line 615, and line 620. For example, the visor controller 160 may provide a voltage on the line 615 to place the display 210 in an off condition, another voltage on the line 620 to place the mirror 215 in a transparent condition, and yet another voltage on the line 610 to modify an optical transmittance of the visor 205. In an example implementation, the voltage provided by the visor controller 160 to the visor 205 may be varied in accordance with a variable setting provided on the selector 625.

The variable setting may be adjusted by the driver 105 based on personal preference. For example, on a very bright day, the driver 105 may desire to increase the amount of blocking provided by the visor 205 and may accordingly turn a knob on the selector 625 (or adjust an icon on a touch screen) to convey his preference to the visor controller 160. The visor controller 160 responds to the request by propagating a voltage at a first amplitude that causes the visor 205 to darken and block more of incoming light from outside the vehicle 115.

On a partially sunny day, the driver 105 may turn the knob on the selector 625 to request darkening the visor 205 to a lower level than that used on the very bright day. The visor controller 160 responds to the request by propagating a voltage at a second amplitude that may be lower than the first voltage so as to configure the visor 205 to provide a reduced level of blocking. The light blocking characteristic of the visor 205 is indicated by an incident light beam 805 of a first intensity and a light beam 810 of a reduced intensity that propagates out of the mirror 215 and into the cabin of the vehicle 115.

Figure 9:
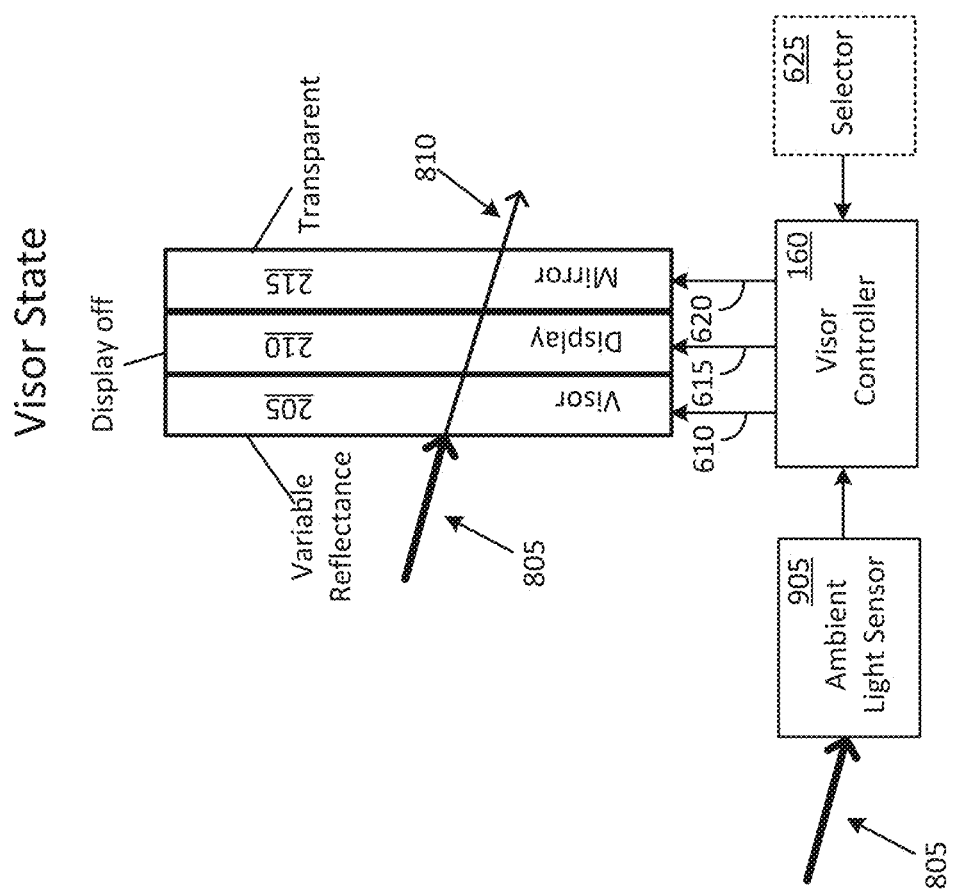
FIG. 9 illustrates some example components that may be provided in a multifunctional visor in accordance with another embodiment of the disclosure.

FIG. 9 illustrates some example components that may be provided in the multifunctional visor 100 in accordance with another embodiment of the disclosure. In this embodiment, an ambient light sensor 905 is coupled to the visor controller 160 in lieu of, or in addition to, the selector 625. The ambient light sensor 905 detects an amount of ambient light present outside the vehicle 115 and produces a sensor signal that is indicative of an intensity of the ambient light. The ambient light outside the vehicle 115 is indicated by the incident light beam 805, which illustrates substantially the same amount of light that is incident upon the visor 205. The sensor signal is coupled into the visor controller 160 which then determines an amplitude of voltage to be provided to the visor 205 based on the intensity of the ambient light. The voltage may be coupled into the visor 205 via the line 610. This arrangement wherein the ambient light sensor 905 is used to automatically control the amount of light blocking provided by the visor 205 frees up the driver 105 to attend to his/her driving tasks without being distracted.

The combinational configuration of the display and the mirror that is described above, may be applicable to the visor as well. Accordingly, in an example embodiment, one portion of the multifunctional visor 100 may be configured to operate as a display (a bottom portion of the multifunctional visor 100, for example) and another portion, as a visor (an upper portion of the multifunctional visor 100, for example). The driver 105 of the vehicle 115 can use this combinational arrangement, for example, to keep an eye upon the display without getting blinded by the sun. Similarly, in yet another embodiment, the visor controller 160 may configure three different portions of the multifunctional visor 100 to provide a combination of a display, a mirror, and a visor.

Figure 10:
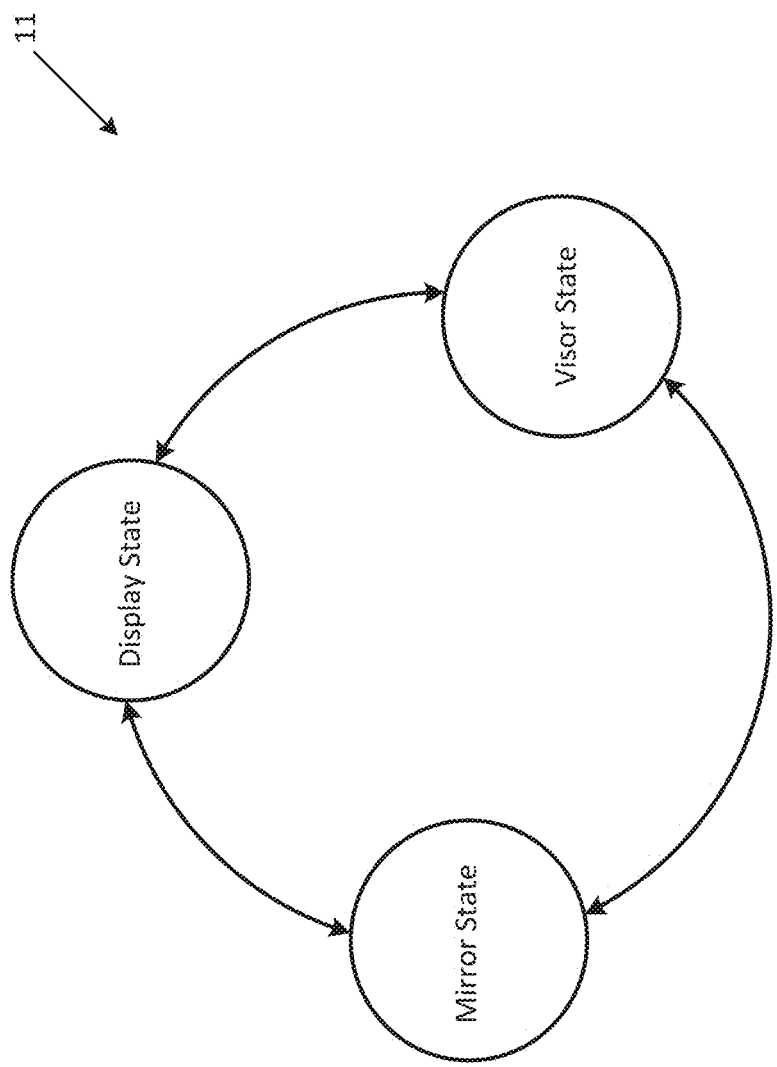
FIG. 10 shows a state diagram to illustrate a transitioning between the various functionalities of the multifunctional visor in accordance with an embodiment of the disclosure.

FIG. 10 shows a state diagram 11 to illustrate a transitioning between the various functionalities of the multifunctional visor 100 in accordance with an embodiment of the disclosure. The state diagram 11 may be implemented in the form of an algorithm that can be included in a software program executed by the visor controller 160. Transitions between the various states may be based on input provided via the selector 625 and/or the ambient light sensor 905.

Figure 11:
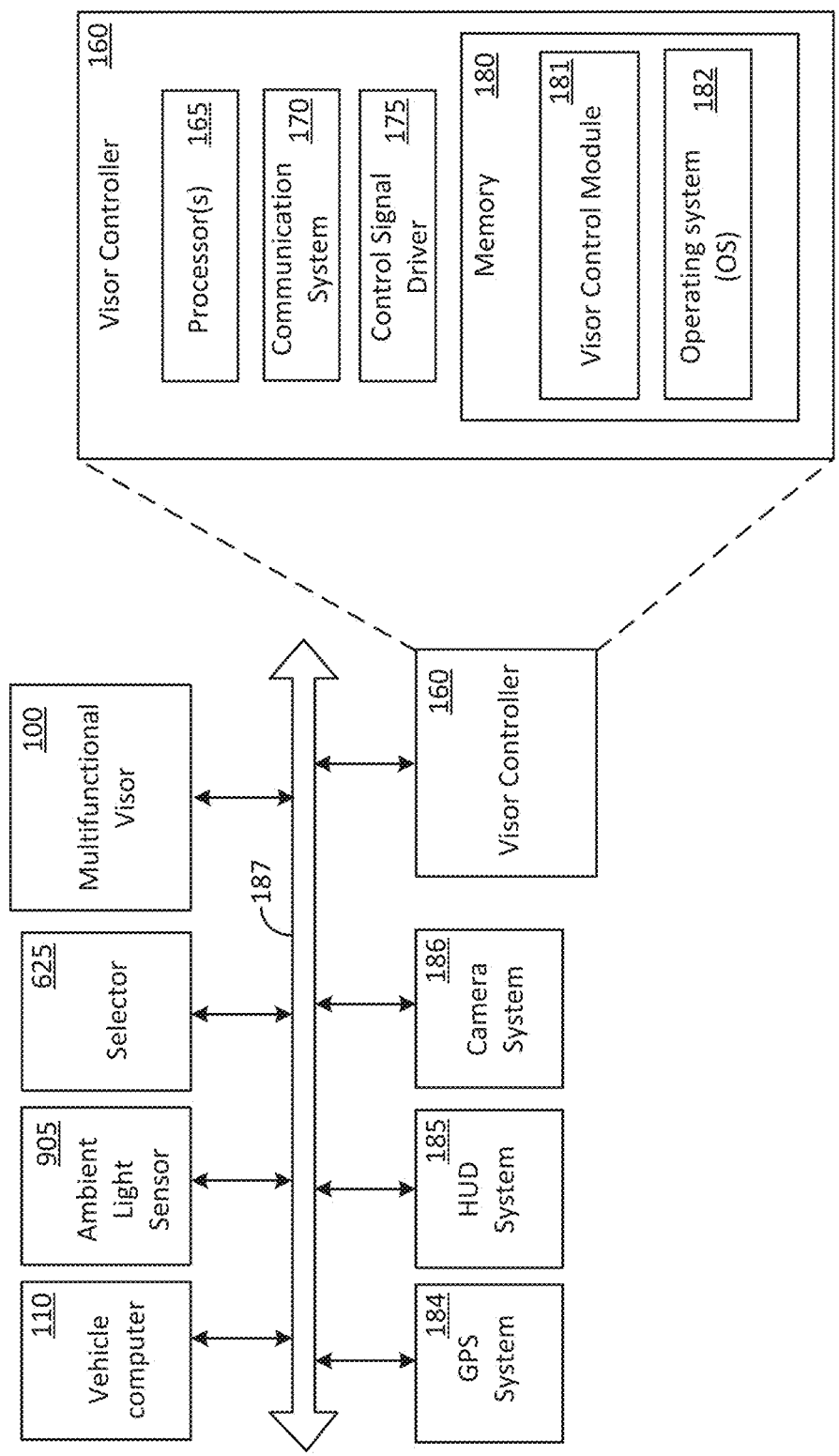
FIG. 11 shows some example components that may be included in a vehicle equipped with a multifunctional visor in accordance with an embodiment of the disclosure.

FIG. 11 shows some example components that may be included in the vehicle 115 that is equipped with the multifunctional visor 100 in accordance with an embodiment of the disclosure. The example components may include the multifunctional visor 100, the vehicle controller 110, the ambient light sensor 905, the selector 625, a GPS system 184, a heads-up display (HUD) system 185, a camera system 186, and the visor controller 160. The various components are communicatively coupled to each other via one or more buses, such as an example bus 187. The bus 187 may be implemented using various wired and/or wireless technologies. For example, the bus 187 can be a vehicle bus that uses a controller area network (CAN) bus protocol, a Media Oriented Systems Transport (MOST) bus protocol, and/or a CAN flexible data (CAN-FD) bus protocol. Some or all portions of the bus 187 may also be implemented using wireless technologies, such as Bluetooth®, Bluetooth®, Ultra-Wideband, Wi-Fi, Zigbee®, or near-field-communications (NFC).

The GPS system 184, the HUD system 185 and/or the camera system 186 may provide images to the multifunctional visor 100 in cooperation with the visor controller 160. The images can be displayed on the display 210 of the multifunction visor 100 by placing the multifunctional visor 100 in the display state as described above. The selector 625 may be operated by an occupant of the vehicle 115 to provide signals to the visor controller 160 for placing the multifunctional visor 100 in any of the display state, the mirror state, or the visor state. The selector 625 may include hardware, such as a knob, for example, that allows the driver 105 to convey to the visor controller 160 his/her preferred level of light blocking when the multifunctional visor 100 is in the visor state as described above. The preference of the driver 105 may also be provided via a touchscreen of an infotainment system (not shown) that can be coupled to the bus 187. The ambient light sensor 905 may be employed to provide automatic light blocking as described above.

The visor controller 160 may include a processor 165, a communication system 170, control signal driver 175, and a memory 180. The communication system 170 can include one or more wireless transceivers that allow the visor controller 160 to transmit and/or receive various types of signals from various devices, such as, for example, Bluetooth® signals associated with a cellular phone used by the driver 105.

The control signal driver 175 can include hardware that generates the various voltages provided to the visor 205, the display 210, and/or the mirror 215 in the form of control signals. The memory 180, which is one example of a non-transitory computer-readable medium, may be used to store an operating system (OS) 182 and various code modules, such as a visor control module 181. The code modules are provided in the form of computer-executable instructions that can be executed by the processor 165 for performing various operations in accordance with the disclosure.

The visor control module 181 may be executed by the processor 165 for performing various operations related to the multifunctional visor 100, such as, for example, determining voltage amplitudes of the control signals based on input provided by the ambient light sensor 905 and/or the selector 625. The operations may further include configuring the control signal driver 175 to produce the control signals based on the voltage amplitudes.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the visor controller 160 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A visor system for a vehicle, the visor system comprising:
   a controller configured to provide control signals; and
   a multifunctional visor comprising a multilayer stack coupled to the controller, the multilayer stack comprising:
      a first layer comprising a first material whose optical transmittance is modifiable to perform a first change between a plurality of states under control of a first control signal provided by the controller, wherein the optical transmittance is based at least in part on an amplitude of the first control signal; and
      a second layer comprising a second material whose optical reflectance is modifiable to perform a second change between the plurality of states under control of a second control signal provided by the controller to the second layer, wherein the first change is different than the second change, and wherein the first change and second change are both performed at a first time.

2. The visor system of claim 1, wherein the multilayer stack is configurable by the controller to be placed in one of: a mirror state, or visor state, or a display state.

3. The visor system of claim 2, wherein the mirror state comprises the second layer configured as a mirror for use by an occupant of the vehicle.

4. The visor system of claim 3, wherein the optical reflectance of the second layer is configurable under control of the second control signal for a binary mode of operation, the binary mode of operation comprising a first mode wherein the second layer is transparent and a second mode wherein the second layer is reflective for providing the mirror state.

5. The visor system of claim 4, wherein the mirror state further comprises the first layer configured to be opaque under control of the first control signal.

6. The visor system of claim 4, wherein the visor state comprises the first layer configured as a sunshade that provides various levels of blocking of sunlight entering a cabin of the vehicle.

7. The visor system of claim 6, wherein the optical transmittance of the first layer is configurable under control of the first control signal to provide the various levels of blocking of sunlight entering the cabin of the vehicle, and wherein a selected level of blocking of the various levels of blocking is based at least in part on an amount of sunlight outside of the vehicle.

8. The visor system of claim 2, further comprising:
   a third layer interposed between the first layer and the second layer, the third layer comprising a display system that turns optically transparent under control of a third control signal provided by the controller.

9. The visor system of claim 8, wherein the display state comprises the third layer displaying at least one of: a speedometer or a GPS route map.

\* \* \* \* \*